United States Patent [19]
Metcalfe et al.

[11] Patent Number: 6,094,511
[45] Date of Patent: Jul. 25, 2000

[54] IMAGE FILTERING METHOD AND APPARATUS WITH INTERPOLATION ACCORDING TO MAPPING FUNCTION TO PRODUCE FINAL IMAGE

[75] Inventors: James Robert Metcalfe, Killara; Timothy Merrick Long, Lindfield; George Politis, Macquarie Fields, all of Australia

[73] Assignees: Canon Kabushiki Kaisha, Tokyo, Japan; Canon Information Systems Research Australia Pty Ltd., New South Wales, Australia

[21] Appl. No.: 08/898,256

[22] Filed: Jul. 22, 1997

[30] Foreign Application Priority Data

Jul. 31, 1996 [AU] Australia ................. PO1356
Jun. 20, 1997 [AU] Australia ................. 26164/97

[51] Int. Cl.[7] .................. G06T 5/00; G06K 9/40; G06F 19/00
[52] U.S. Cl. .................. 382/260; 382/263; 382/264; 702/190; 702/194
[58] Field of Search .................. 382/260, 263, 382/264, 300, 261, 266, 269, 299, 275; 358/447, 461; 702/190, 191, 194, 195; 348/606, 625

[56] References Cited

U.S. PATENT DOCUMENTS

| | | | |
|---|---|---|---|
| 5,173,948 | 12/1992 | Blackham et al. | 382/293 |
| 5,392,137 | 2/1995 | Okubo | 358/462 |
| 5,392,365 | 2/1995 | Steinkirchner | 382/22 |
| 5,432,716 | 7/1995 | Lebowsky et al. | 702/190 |
| 5,513,120 | 4/1996 | Berlad | 364/723 |
| 5,526,446 | 6/1996 | Adelson et al. | 382/275 |
| 5,686,960 | 11/1997 | Sussman et al. | 382/260 |

FOREIGN PATENT DOCUMENTS

4105517A1  2/1991  Germany ................. H03H 17/02

*Primary Examiner*—Scott Rogers
*Attorney, Agent, or Firm*—Fitzpatrick, Cella, Harper & Scinto

[57] ABSTRACT

An image signal in filtered to provide a filtered image signal representing a filtered image, and a mapping function is determined from a predetermined arbitrary function of the image signal. The filtered image signal and the image signal are interpolated in accordance with the mapping function to produce a final image signal representing a final image. The interpolation includes adjusting an opacity of each picture element of the image signal and the filtered image signal in accordance with the mapping function. In a final image, a smoothed transition is produced between the filtered image signal and the image signal. Preferably, the determination of the mapping function is also dependent upon the filtered image signal, and the mapping function is an absolute value of a difference between the image signal and the filtered image signal.

44 Claims, 6 Drawing Sheets

IMAGE FILTERING METHOD AND APPARATUS WITH INTERPOLATION ACCORDING TO MAPPING FUNCTION TO PRODUCE FINAL IMAGE

The present invention relates to image processing involving filtering of an image, and in particular, to a method and apparatus for enhancing an image.

BACKGROUND

In recent years, computer output devices including display screens, color printers and output devices capable of displaying a quality picture have become increasingly popular. Unfortunately, there is associated with outputting a quality picture a certain amount of image filtering or image processing. For example, image filtering may be used to enhance image detail following a deterioration of image data resulting from inputting an image using an input device and subsequently displaying the input image on an output device. Typically, blurring or defocusing of an image occurs when a picture (image) is scanned using an image scanner, or when a geometrically transformed image is constructed by means of interpolation between image picture elements.

A technique commonly adopted in photography for overcoming the problems with such defocusing or blurring of the scanned image is to sharpen the image using an "unsharp mask" filter. The unsharp mask filter takes its name from traditional photographic darkroom techniques of enhancing the edges of a graphical object of an image by removing or subtracting an "unsharp" or low-pass filtered (smoothed) from of the image from the original image.

The general principle of unsharp mask filtering is to add to an original image signal, representing an image, a constant amount of high-pass filtered signal (or "edge" sharpened signal) derived from the original image signal. The high-pass filtered signal is determined, for example, by removing from the original image signal a low-pass (unsharpened) filtered signal derived from the original image signal. Unfortunately, this traditional form of unsharp filtering is disadvantageous in that it results in an abrupt transition between the original signal and the high-pass filtered signal, especially where an abrupt edge is present in the original image. Further, conventional unsharp filtering is disadvantageous in that it also enhances high-frequency noise contained in the input image.

Thus, a need clearly exists for an improved image filtering technique that overcomes one or more of the disadvantages of conventional image "sharpening" techniques. A need exists for an image filtering technique in which an image signal and one or more filtered signals, or two or more differently filtered signals are combined in a predefined manner to reduce or eliminate noise in the output signal. A need also exists for an image sharpening technique that has a soft transition providing a smooth change between an original image signal and high-pass filtered or sharpened signal. Preferably, the transition between the original image signal and the high-pass filtered signal can be determined by a predetermined function of the original image signal, rather than filtering by a constant amount. Further, it is desirable to have an image filtering method that can be easily implemented with image compositing,

SUMMARY

In accordance with a first aspect of the present invention, there is provided a method of filtering an image signal, the image signal representing an image, said method comprising the steps of:

filtering the image signal to provide a filtered image signal representing a filtered image;

determining a mapping function from a predetermined continuous arbitrary function of said image signal; and interpolating between the filtered image signal and the image signal in accordance with said mapping function to produce a final image signal representing a final image.

In accordance with a second aspect of the present invention there is provided a method of filtering an image signal, the image signal representing an image, said method comprising the steps of:

applying a first filter to the image signal to provide a first filtered image signal;

applying a second filter to the image signal to provide a second filtered image signal;

generating a mapping function from a predetermined continuous arbitrary function of said image signal; and interpolating between the first and second filtered image signals in accordance with said mapping function to produce a final image signal.

In accordance with a third aspect of the present invention, there is provided an apparatus for filtering an image signal representing an image, said apparatus comprising:

input means for receiving said image signal;

at least one filtering means, coupled to the input means, for filtering the image signal to provide a corresponding filtered signal;

mapping means, coupled to the input means and capable of receiving the image signal, for providing a mapping function of the image signal in accordance with a predetermined continuous or arbitrary function;

compositing means, coupled to the input means, the at least one filtering means and the mapping means, for interpolating between said image signal and said each filtered signal in accordance with the mapping function to provide a final image signal.

In accordance with a fourth aspect of the invention, there is provided a computer program product having a computer readable medium having a computer program recorded thereon for filtering an image signal, the image signal representing an image, said computer program product comprising:

means for filtering the image signal to provide a filtered image signal representing a filtered image;

means for determining a mapping function from a predetermined continuous arbitrary function of said image signal; and means for interpolating between the filtered image signal and the image signal in accordance with said mapping function to produce a final image signal representing a final image.

In accordance with a fifth aspect of the invention, there is provided a computer program product having a computer readable medium having a computer program recorded thereon for filtering an image signal, said method comprising the steps of:

first filtering means for filtering the image signal to provide a first filtered image signal;

second filtering means for filtering the image signal to provide a second filtered image signal;

means for generating a mapping function from a predetermined continuous arbitrary function of said image signal; and means for interpolating between the first and second filtered image signals in accordance with said mapping function to produce a final image signal.

BRIEF DESCRIPTION OF THE DRAWINGS

The embodiments of the present invention are described hereinafter with reference to the accompanying drawings, in which.

DETAILED DESCRIPTION

Overview

The embodiments of the present invention relate to methods, apparatuses and systems for image filtering in which an image signal and one or more filtered signals, or at least two differently filtered image signals, are combined using a predetermined arbitrary function of the image signal. This provides a smooth change between an original image signal and a filtered signal. The predetermined function of the original image signal is used to determine the transition between the original image signal and the filtered signal, and is preferably continuous or piece-wise continuous. If the function is piece-wise continuous, it is characterised by the domain of the function mapping to more than two corresponding range values.

Figure 8:
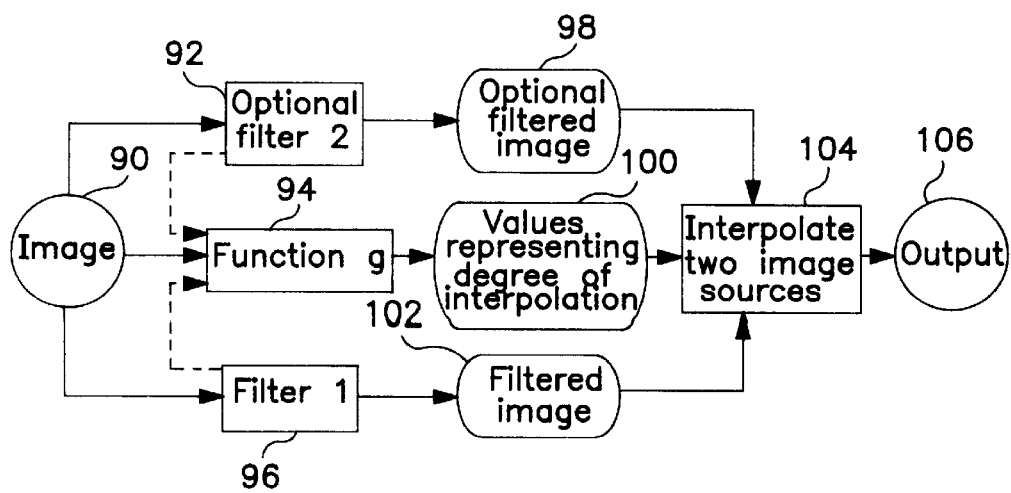
FIG. 8 is a generalised overview of the image filtering techniques according to the embodiments or the invention.

FIG. 8 is a flow diagram providing a generalised overview of image enhancing according to the embodiments of the invention. An image 90 is provided as input to the image filtering steps. The process comprises a (first) filtering step 96 for producing a filtered or sharpened image 102 from the input image 90. Preferably, the step 96 involves high-pass filtering the image 90. A further step 94 determines a mapping function 100 using the input image 90, where the mapping function is dependent on a predetermined function g of the image 90. The function is determined from the input image and is used to control the transition in pixel values between the original image signal and the filtered signal. The input image 90 may be provided to step 104 for interpolating or combining two image sources. Optionally, a second filtering step 92 (optional filter 2 in the flow diagram) may be applied to the input image 90 to produce a filtered original image 98 that can be provided to the interpolating step 104 instead. This may involve low-pass filtering the image 90.

As shown in FIG. 8, dashed arrows between the first filter 96 and step 94 and between the optional filter 92 and step 94 indicate that the output of the filters 92, 96 may optionally be provided as inputs to step 94 as well, dependent on the particular continuous or piece-wise continuous mapping function being practiced. This aspect of the invention is described in greater detail hereinafter with reference to the third and fourth embodiments.

In step 104, either the input image 90 or the filtered original image 98 is interpolated with the preferably sharpened image 102 using the mapping function 100 to provide an output image 106. The output image 106 is a filtered version of the input image, but also is one that has reduced noise between the input image 90, 98 and the filtered image 102. Specific embodiments of this generalised image, enhancing technique are described hereinafter with respect to FIGS. 1 to 7. Numerous specific details, such as ranges of gradient map values, RGB color space, an exemplary computer architecture for implementing the technique, etc. are described in detail to provide a more thorough description. It will be apparent, however, to one skilled in the art that the present invention may be practiced without these specific details. In other instances, well-known features have not been described in detail so as not to unnecessarily obscure the present invention.

Process of First Embodiment

Figure 1:
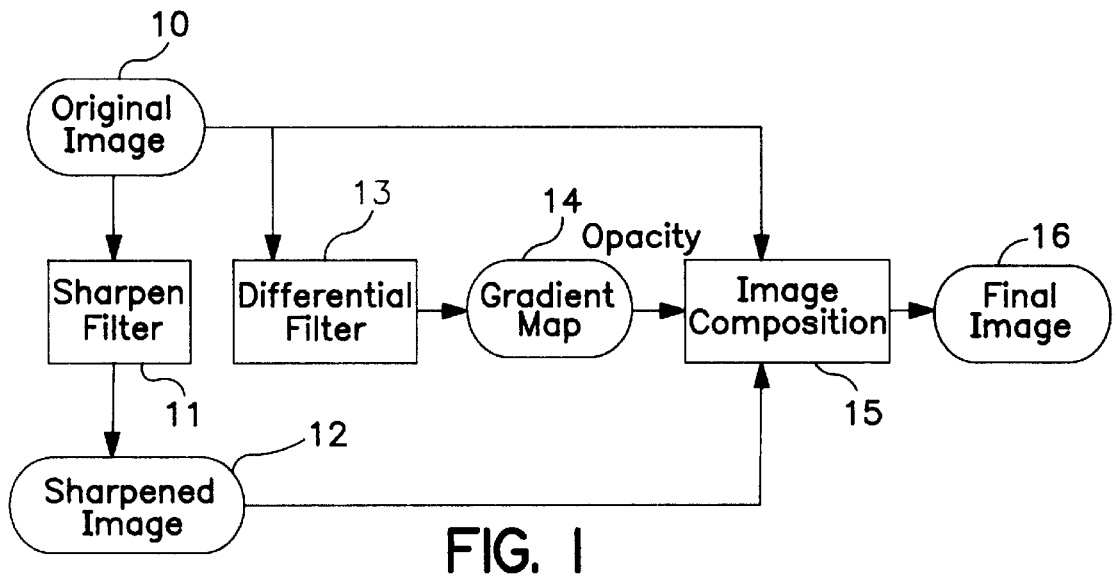
FIG. 1 is a flow diagram illustrating a process of image filtering according to a first embodiment of the invention.

FIG. 1 is a flow diagram illustrating the image filtering or enhancing process according to the first embodiment of the invention. An input image 10 (referred to below as the original image) is processed by a sharpen filter 11 to provide a sharpened image 12. The sharpen filter 11 accentuates sharp or abrupt changes in the image and enhances the detail of the image. However, sharpening an image tends to exaggerate features of the image that may be considered undesirable by a viewer. For example, unwanted noise in the input image 10 is also enhanced by the sharpen filter 11 so that the sharpened image 12 may include a "sharpening" of the unwanted noise.

Preferably, the original image 10 is also processed through a differential image filter 13 which produces a "gradient map" 14 of the original image 10. The gradient map 14 is produced by spatially differentiating the original image 10, and taking the absolute value (i.e. magnitude) of the resultant values. Typically, the gradient map 14 is normalised to have values ranging between zero (0) and one (1). In a discrete pixel (or digital) representation of the original image 10, a point in the gradient map 14 having a value of one (1) represents a maximum difference between two adjacent picture element values of the original image 10.

In an analog signal representation of an original image, a gradient map of the image represents a normalised direct differentiation of the spatial frequencies of the analog signal. Therefore, a value of one (1) at any point in the gradient map represents a maximum gradient, while a value of zero (0) represent substantially no gradient in the analog signal.

In the first embodiment, the original image 10 is directly input to an image compositing step 15. However, it will be understood by a person skilled in the art that an "identity filter" can also be applied to the original image 10 before providing the filter output to the compositing step 15. Mathematically, this is equivalent to not applying any filter at all to the original image 10, since the "identity filter" provides a resultant output signal that is identical to an input signal applied to the identity filter.

The image compositing step 15 takes as inputs the original image 10, the sharpened image 12 and the gradient map 14 of the original image 10.

In the first embodiment, the gradient map 14 is a function of the original image 10 and is used to determine the opacity of each picture element of the original image 10 and each corresponding picture element of the sharpened image 12, which are composited to produce the final image 16.

Figure 2:
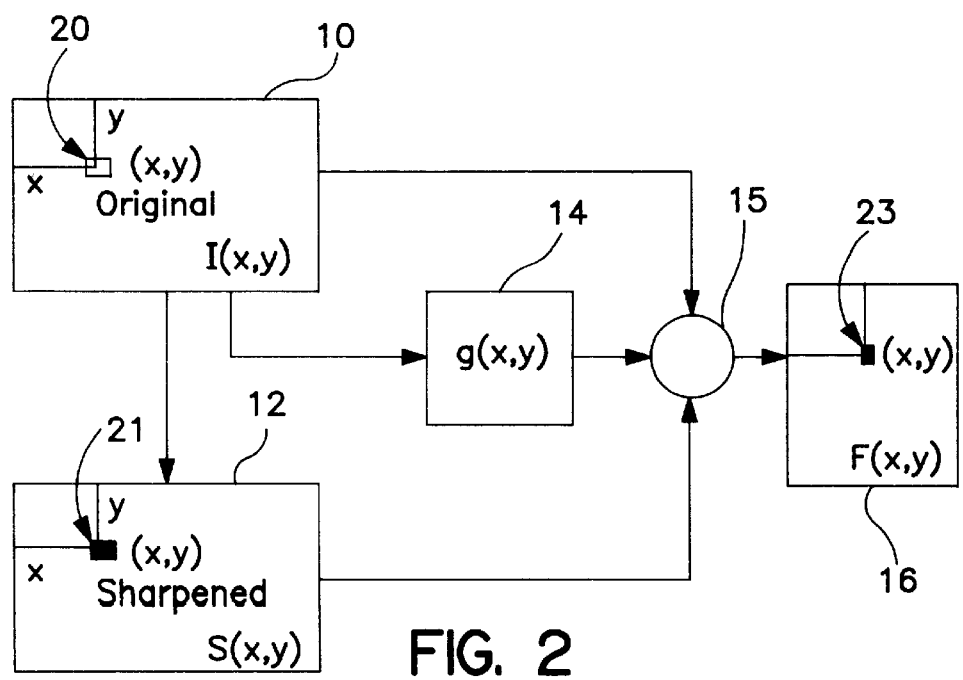
FIG. 2 shows a schematic diagram of the image-filtering process steps of FIG. 1.

Referring now to FIG. 2, and for the purpose of the examples described herein, the original image 10 and the sharpened image 12 are assumed to each comprise a plurality of picture elements. The location of these picture elements in each image are denoted by coordinates "x" and "y". The coordinates are measured from the upper left corner of each image 10, 12 with "x" indicating the number of picture elements to the right and "y" indicating the number of picture elements down, respectively, in relation to the upper left corner. The equivalent in an analog signal of each image is a point in the signal corresponding to an x and y coordinate position measured to the right and down from an upper-left corner of the image. Each picture element of the original image 10 can be denoted by I(x,y) as a picture element value 20 at location x,y of the image 10. Similarly, S(x,y) denotes a picture element value 21 at location x,y of the sharpened image 12.

The value of the gradient map 14 corresponding to the picture element value 20 of the original image 10 is represented by a normalised function g(x,y), which can take on values between zero (0) and one (1). In the image compositing step 15, the value g(x,y) of gradient map 14 is used to determine the opacity of the corresponding picture elements 20,21 of the original image 10 and the sharpened image 12, respectively. This is done in a manner so that, when the picture element values 20,21 of the original image 10 and sharpened image 12 are added, the result F(x,y) is a picture element value 23 for the final image 16 in accordance with value g(x,y) of the gradient map 14. For example, if the gradient map 14 of the original image 10 has a value of one (i.e. g(x,y)=1) implying a sharp gradient at the location x,y of the image 10, the opacity of the picture element 21 of sharpened image 12 is set to fully opaque, the opacity of the picture element 20 of original image 10 is set to transparent, and these picture element values 20,21 are added together to result in the picture element 23 of the final image 16. The resultant final image picture element 23 therefore takes on the value of the picture element 21 of the sharpened image 12.

In general, the gradient map 14 value takes on values between zero (0) and one (1), so the resultant final image 16 is a proportional combination of I(x,y) and S(x,y) in accordance with the value of g(x,y). An example of this proportional combination can be described by a mathematical relationship as follows:

$$F(x,y)=(1-g(x,y))I(x,y)+g(x,y)S(x,y), \qquad (1)$$

where F(x,y) is the picture element 23 of the final image 16. The final image 16 is often referred to as the "unsharp mask filtered" image.

In some color images, in particular those intended for computer graphics, each picture element of an image can be represented by a plurality of color components (e.g., Red, Green, Blue (R,G,B)) and an opacity or alpha channel representing the opacity of each picture element. Therefore, each picture element can typically be represented by a color quadruple (R,G,B, α) where "α" is an opacity value between zero (totally transparent) and one (fully opaque). Often when compositing an image, it is advantageous to "premultiply" the opacity value "α" with the color components (i.e. (αR, αG, αB, α)). Assuming that each picture element I(x,y) of the original image 10 and each picture element S(x,y) of the sharpened image 11 comprise a plurality or premultiplied color quadruples (i.e. (αR, αG, αB, α)), then Equation 1 applies to each premultiplied color component and α-channel of I(x,y) and S(x,y) to result in corresponding premultiplied color components of F(x,y).

It will be apparent to those skilled in the art that an arbitrary function of the original image may be used as g(x,y) in Equation 1. Preferably, the arbitrary function is continuous or piece-wise continuous. For example, g(x,y) in Equation 1 may be gradient map values that are modified by a lookup table to achieve a desired effect like enhancing certain edges of an image to obtain non-linear effects, or to correct undesired effects as a result of sharp unwanted gradients of the original image 10.

Figure 3:
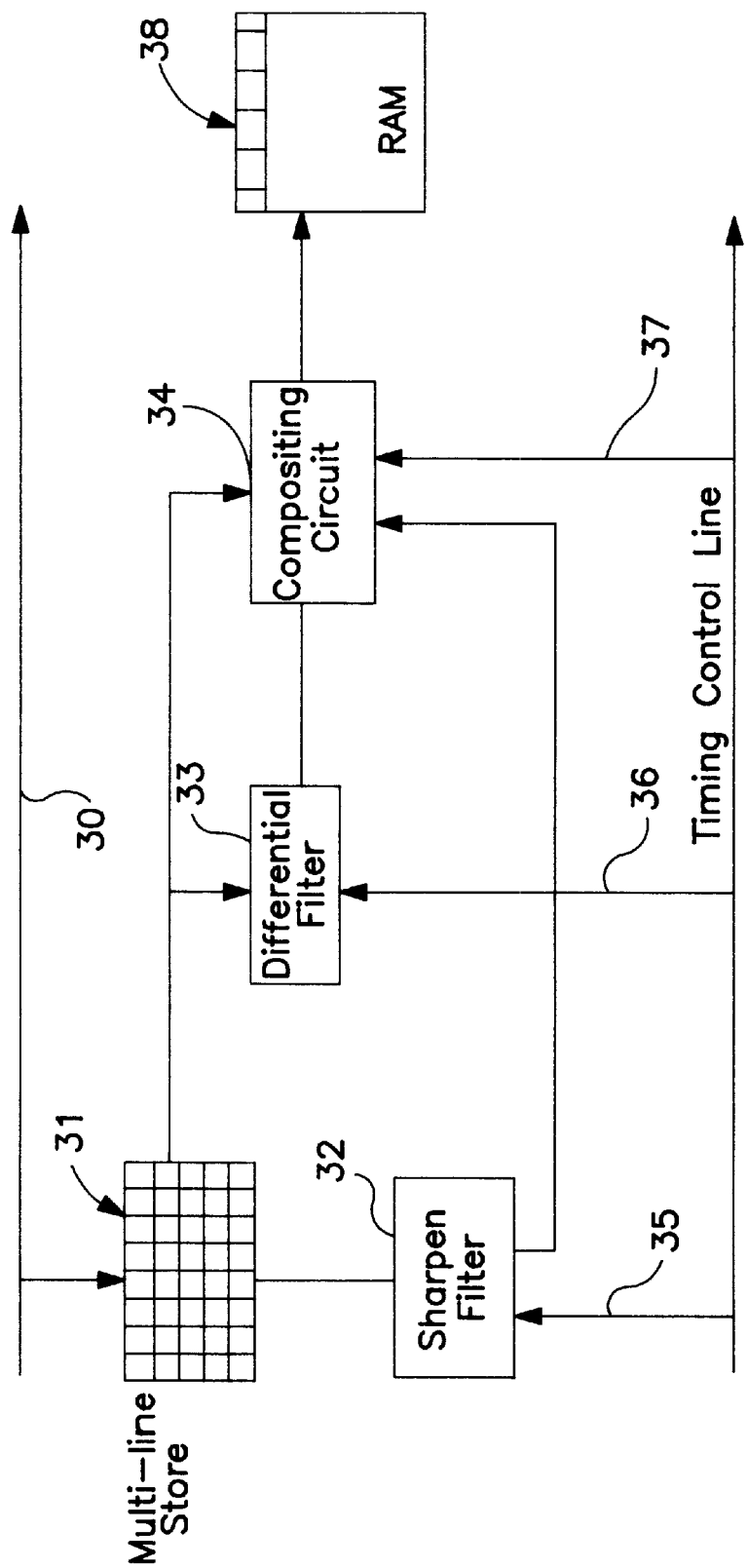
FIG. 3 illustrates an apparatus according to the first embodiment.

Pseudocode for implementing the process of FIGS. 1 to 3 is set forth in derail in Table 1.

TABLE 1

Let x = image.
Convolve image x with a sharpen filter, giving sharpened image s.
Take gradient of image x and store result in mapping function g.
Apply color map to g, such that opacity channel is set to average of color channels.
Output = (s in g) plus (x out g).

The image x, sharpened images, mapping function g, and output correspond to the image 10, sharpened image 12, gradient map 14 and final image 16, respectively, shown in FIG. 1. This pseudocode may be implemented as software executing on a computer having a graphics accelerator, as described in further detail below. Advantageously, the process can be carried out utilizing convolution and compositing operations carried out by the graphics accelerator. It will be apparent to one skilled in the art that the operators shown in the pseudocode expression of the output image in Table 1 are conventional compositing operators ("in", "or") and binary operation ("plus").

Apparatus of First Embodiment

Referring now to FIG. 3, an apparatus in accordance with the first embodiment is illustrated wherein a data bus 30 communicates data to a multi-line store 31. The multi-line store 31 stores a plurality of data representing at least a portion of an original image 10 received from the data bus 30. A sharpen filter 32, a differential filter 33 and a compositing circuit 34 are all coupled to the multi-line store 31 and extract data information from the multi-line store 31. The outputs of the differential filter 33 and the sharpen filter 32 are each coupled to the compositing circuit 34. The multi-line store 31 is preferred since the sharpen filter 32 and the differential filter 33 require information about at least one neighbouring picture element to process a current picture element. For example, the differential filter 33 requires at least two picture element values to determine a gradient between the picture elements. Not illustrated in FIG. 3, but included as part of the differential filter 33 is a normalising circuit that normalised the result output by the differential filter 33 to provide values between zero (0) and one (1).

Timing control lines 35,36 and 37 are provided to the sharpen filter 32, the differential filter 33 and the compositing circuit 34, respectively, to synchronise the corresponding processing so as to composite corresponding picture elements received by the compositing circuit 34 from the multi-line store 31, the differential filter 33 and the sharpen filter 32. The compositing circuit 34 outputs a composite picture element F(x,y) in accordance with Equation 1, and stores this information in random access memory (RAM) 38 and/or outputs this information to a display device.

Figure 9:
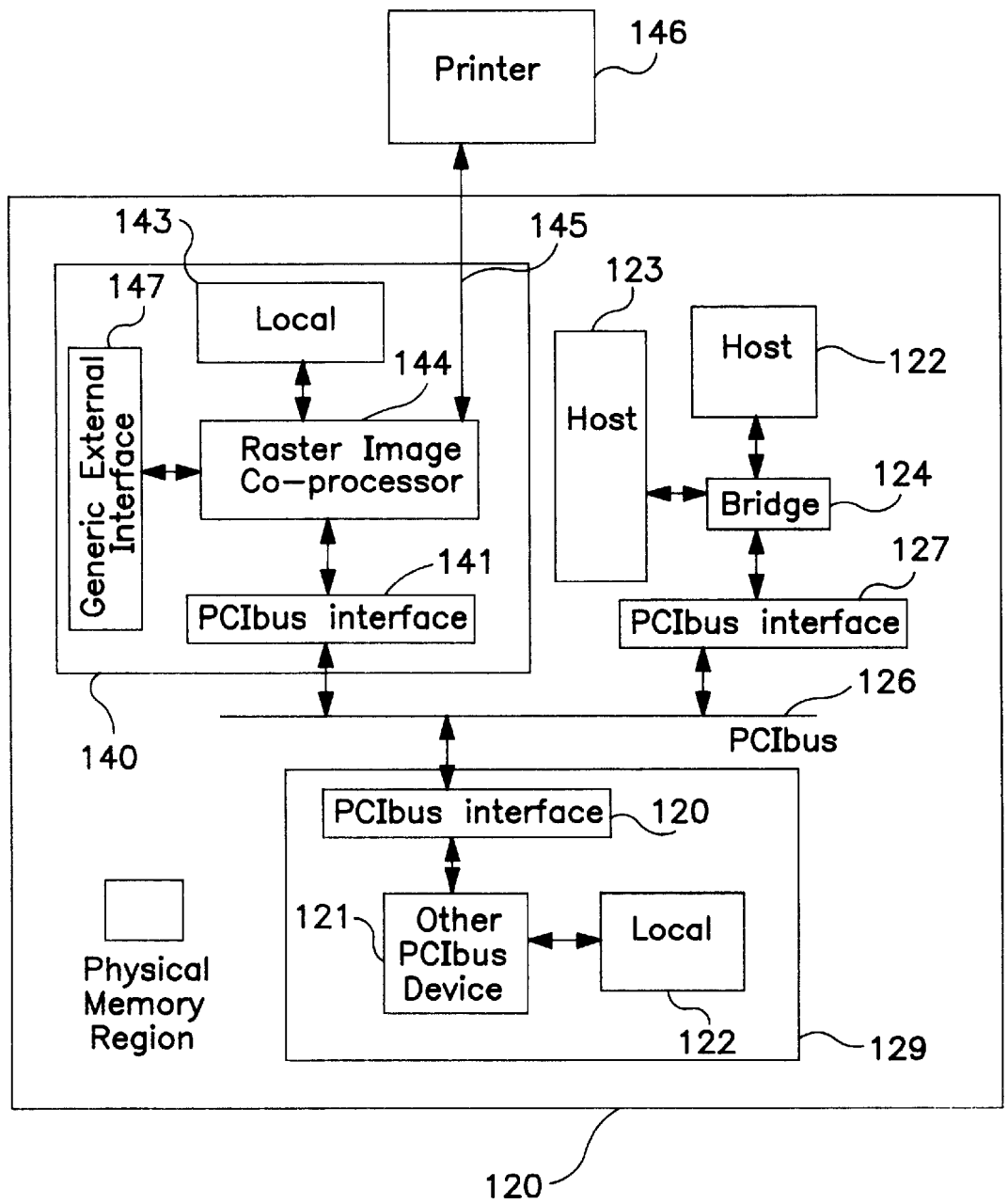
FIG. 9 is a block diagram illustrating an exemplary computer platform for implementing the embodiment of the invention.

The embodiments of the invention can preferably be practiced using a conventional general-purpose computer, including IBM-PC/ATs and compatibles, Macintosh computers and Sun SparcStations, for example. FIG. 9 illustrates an exemplary computer architecture on which the method and apparatus of the first embodiment shown in FIGS. 1 to 3 are implemented as software executing on the computer. Likewise, the embodiments of the invention described hereinafter and shown in FIGS. 4 to 7 can practiced with such a computer. In particular, the steps of the image enhancing technique are effected by instructions in the software that are carried out by the computer, and in particular are preferably carried out using a graphics accelerator, image processor, or the like. In the embodiment shown in FIG. 9. a raster image co-processor is used to implement the image enhancing technique.

FIG. 9 simply illustrates the computer 120 connected to a printer 146. However, it will be well understood to a person skilled in the art that such a computer may also comprise a video display, input devices, and a number of internal peripheral devices generally represented by block 129. The printer 146 may be any of a number of output devices including line printers, laser printers, plotters, and other reproduction devices.

The computer 120 comprises a host central processing unit (CPU) 122, host random access memory (RAM) 123, a Peripheral Component Interconnect (PCI) bus 126 a bridge circuit 124, a graphics hardware accelerator 140, and one or more peripheral devices 129. In the drawing, physical memory regions are represented by grey-filled blocks. The PCI bus 126 is connected to the host CPU 122, the peripheral device 129 and the graphics accelerator 140 by respective PCI-bus interfaces 127, 120 and 141. The host CPU 122 and the host memory 123, which may be interconnected by a local bus, are connected to the PCI-bus interface 127 by bridging circuitry 124 well known to those skilled in the art. The peripheral device 129 includes another PCI-bus device 121 and may be connected to local memory 122. The graphics hardware accelerator 140 comprises a raster image processor (RIP) 144 connected to the PCI-bus interface 141. In turn, the RIP 144 is connected to a generic external interface 147, local memory 143 and the printer 146 via a port 145. The generic external interface 127 permits connection to external devices.

The host CPU 122 sets up various commands for unsharp masking in the host memory 123. The various commands are directed to the RIP 144, which is capable of executing the commands. The commands are preferably a series of coded instructions that instruct the RIP 144 of the graphics accelerator 140 to perform operations, including convolutions and compositing operations, on image data (pixels). The image data is supplied to the RIP 144 by the host CPU 122 via the PCI bus 126. Using the RIP 144, a convolution operation having a predetermined kernel can be applied to image data to produce a blurred image. Alternatively, the convolution operation could produce a sharpening of the image dependent upon the kernel used. Compositing operations are known to those skilled in the art and include operations such as those set forth in the article "Compositing Digital Images" written by Thomas Porter and Tom Duff and published in *SIGGRAPH* 84 at pp. 253–259 and *Computer Graphics*, Vol. 18. No. 3, July 1984. The compositing operations provide a technique for combining the image data with the blurred image data and/or the sharpened image data produced by the convolution operation to achieve a desired result. The compositing operations are performed by the RIP 144 having received compositing instructions from the host CPU 102 via the PCI-bus interface 141.

In processing an image to achieve a desired result, pixel data relating to intermediate stages are stored in local memory 143. For example, sharpened image data is stored in the local memory 143 after a convolution operation for sharpening image-pixel data is performed. The sharpened image pixel data stored in local memory 143 can then be reused by the RIP 144. For example, the RIP 144 can use the stored data to calculate a difference value between the original image data and the sharpened image data. The difference value can be stored in the local memory 143 and later retrieved by the RIP 144 to calculate an absolute value (modulus) of the difference value resulting in a value for the mapping or gradient function, in accordance with the third embodiment described hereinafter.

White the first embodiment has been described in relation to a specific PC platform, the embodiment may be practiced in numerous other ways without departing is from the scope and spirit of the present invention. For example, the image filtering technique can be embodied in an application specific integrated circuit (ASIC). It will be apparent to one skilled in the art that the further embodiments of the invention described hereinafter can equally be practiced in these manners.

Process of Second embodiment.

Figure 4:
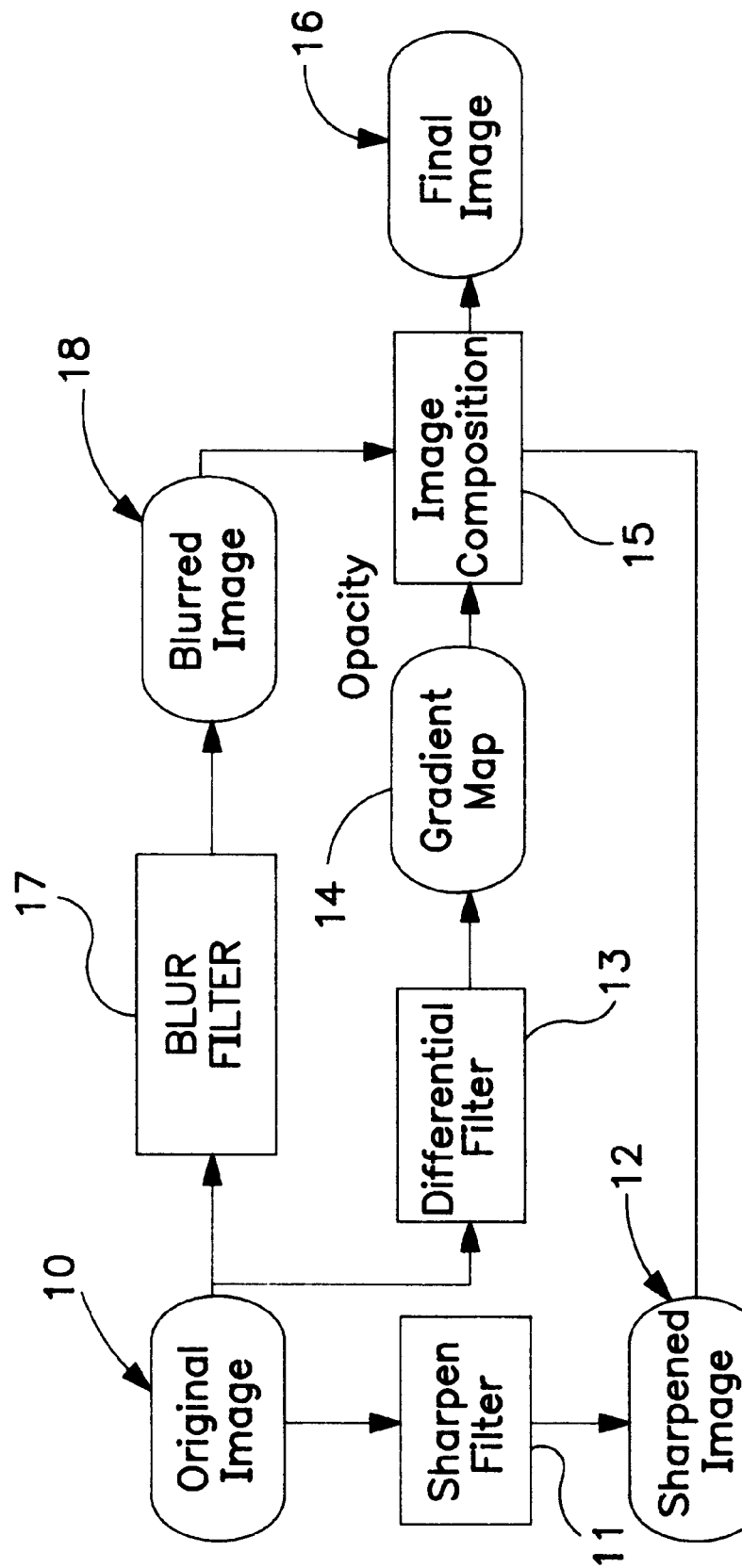
FIG. 4 is a flow diagram illustrating a process of image filtering according to a second embodiment of the invention.

FIG. 4 is a flow diagram illustrating the image filtering or enhancing technique of the second embodiment. Like elements of the first embodiment of FIG. 1 contained in the second embodiment are shown in FIG. 4 with the same reference numerals. However, the original image 10 is filtered using a blur filter 17 in FIG. 4 before being directed to the image compositing step 15. The blur filter 17 replaces the "identity filter" (or no filter), if implemented, of the embodiments discussed above. The blur filter 17 averages values over a plurality of picture elements of the original image 10 for each picture element produced in a blurred image 18, which is provided to the compositing step 15. The blur filter 17 smooths out abrupt changes in an image 10 and consequently tends to disguise sharp transitions resulting from undesired noise in the image 10.

Figure 5:
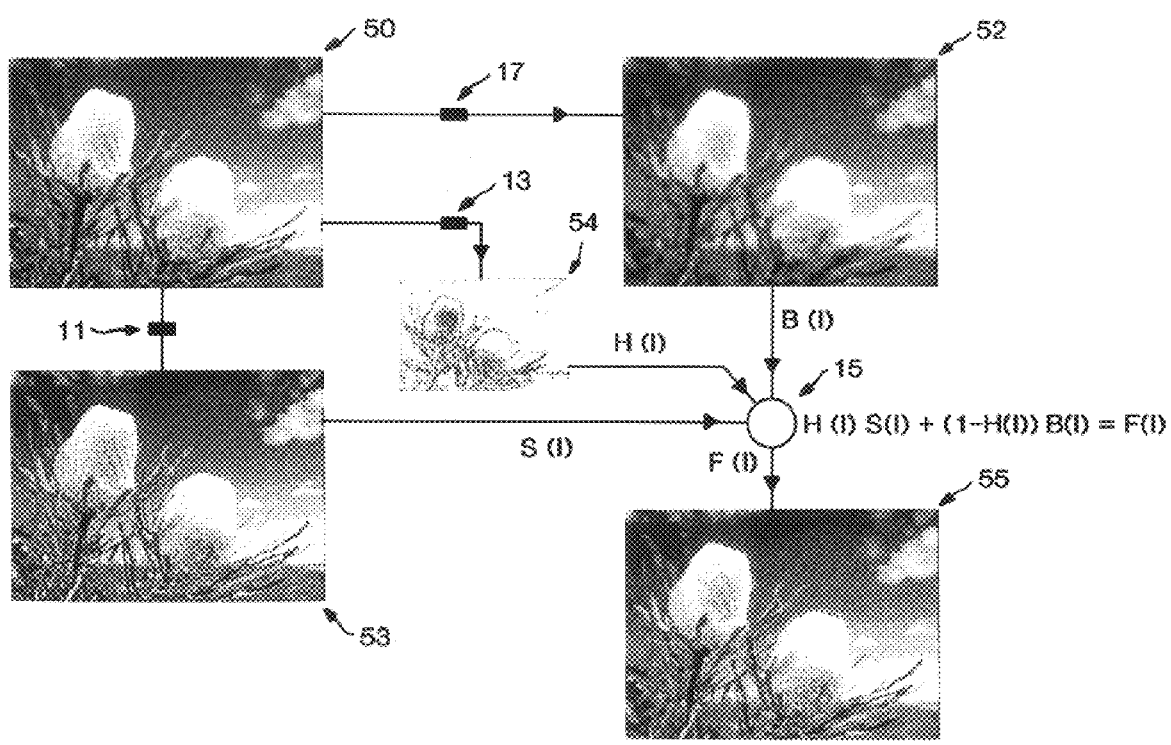
FIG. 5 illustrates an example of the intermediate images for each step according to the second embodiment of FIG. 4.

Turning now to FIG. 5, an example of image filtering is illustrated according to the second embodiment of FIG. 4. An original image 50 (depicting a banksia shrub) is provided to the blur filter 17, the sharpen filter 11 and the differential filter 13 (each depicted by a blackened rectangle in FIG. 5) which output a blurred image B(I) 52, a sharpened image S(I) 53 and a gradient map image H(I) 54, respectively. The gradient map image 54 is an "edge" representation image showing substantially more pronounced edges of the graphical object of the original image 50. The gradient map no image 54 is denoted in FIG. 5 as the function H(I), where I is a picture element value at position x,y of the original image 50.

Further, the function H(I) is normalised to values between zero (0) and one (1), such that a picture element of the gradient map image 54 at the most pronounced edge has a value of one (1) and a picture element at the least pronounced edge (i.e., no edges) has a value of zero (0).

Corresponding picture elements B(I) and S(I) of the blurred image 52 and sharpened image 53, respectively, are composited in the compositing step 15 using the gradient map image 54 to produce a final image 55 having a picture element value at location x,y denoted by F(I).

The final image 55 has the combined filtered features of the blurred image 52 and the sharpened image 53 in accordance with values determined from the gradient map image 54. In combining the blurred image 52 with the sharpened image 53, the opacity value of each picture element of the blurred image 52 has a complementary value to that of the opacity value of each corresponding picture element of the sharpened image 53. Thus, the sum of the opacity value of each picture element of the blurred image 53 and the opacity value of each corresponding picture element of the sharpened image 53 totals to a value equivalent to fully opaque. For example, a picture element of the gradient map image 54 taking on a value of 0.75 results, when composited in steps 15, in a final picture element value comprising twenty-five percent opacity of the corresponding blurred image 52 picture element and twenty-five percent opacity of the corresponding sharpened image 53 picture value.

Applying a gradient mapping function 13 to the opacity of picture elements of filtered images being combined is advantageous because it lends itself to image compositing using image compositing operators. However, those skilled in the art will recognise that other techniques for combining picture elements other than relying upon the opacity of the picture elements may be practiced without departing from the scope and spirit of the invention. For example, a color blend between a first color of a picture element of one image and a second color of another image can be obtained by a simple (or complex) interpolation.

Pseudocode for implementing the process of FIGS. 4 and 5 is set forth in detail in Table 2.

TABLE 2

Let x = image.
Convolve image x with a blur filter, giving blurred image b.
Convolve image x with a sharpen filter, giving sharpened image s.
Take gradient of image x and store result in mapping function g.
Apply color map to g, such that opacity channel is set to average of color channels.
Output = (s in g) plus (b out g).

The blurred and sharpened images correspond with images B(I) and S(I) of FIG. 5. Further, the mapping function g and the output correspond to the map H(I) and the final image F(I).

In a variation of the second embodiment shown in FIG. 4, the sharpen filtering step 11 could be omitted, and instead of providing sharpened image 12 to step 15, original image 10 is provided to step 15. All other features of FIG. 4 being substantially the same, this variation of the second embodiment provides image noise reduction technique.

Process of Third Embodiment

Figure 6:
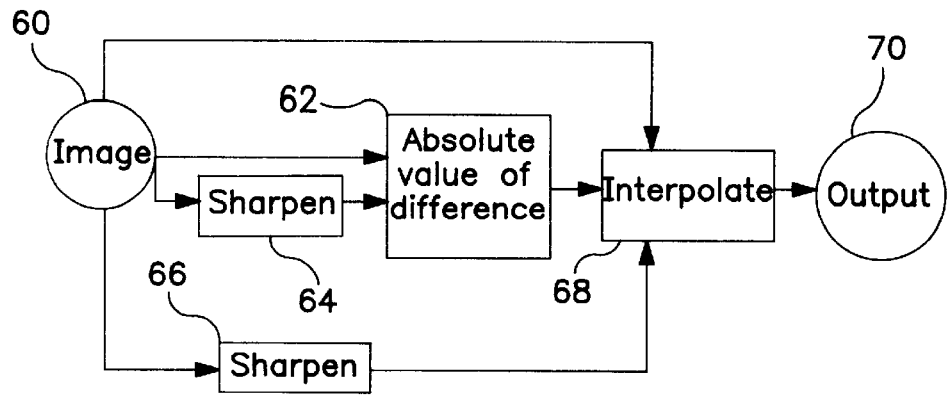
FIG. 6 is a flow diagram illustrating a process of image filtering according to a third embodiment of the invention.

FIG. 6 is a flow diagram illustrating the image filtering process according to the third embodiment of the invention. An input image 60 is provided as input to an interpolation step 68, a step for determining the absolute value of a difference 62, and first and second sharpening filtering steps 64 and 66. The output of the first sharpening filtering step 64 is provided as a second input to the step of determining an absolute value of a difference 62 between the sharpened image and the original image 60. In particular, step 62 computes the difference between the two images and then determines the absolute value of that difference, which is provided as the mapping function provided to the interpolation step 68. This form of mapping function is preferable in that it is capable of more efficiently and more quickly being carried out in software and is hardware applications. The sharpened image provided by step 66 is also provided to the interpolation step 68, where the original image 60 and the sharpened image output by step 66 are interpolated or combined dependent upon the mapping function provided by step 62 to provide the final output image 70.

The third embodiment of the invention shown in FIG. 6 requires the sharpening filter 64, 66 to be applied twice to the original image 60. In a fourth embodiment shown in FIG. 7, being a modification of the third, a more efficient image filtering method can be practiced if the mapping function g of FIG. 6 is allowed to be a continuous or piece-wise continuous function of more than one source, i.e., a combination of any of the following: the original image 60, the output of the first sharpening filter 64, and the output of a second sharpening filter 66. Thus, the embodiment of FIG. 6 is shown in FIG. 7.

Figure 7:
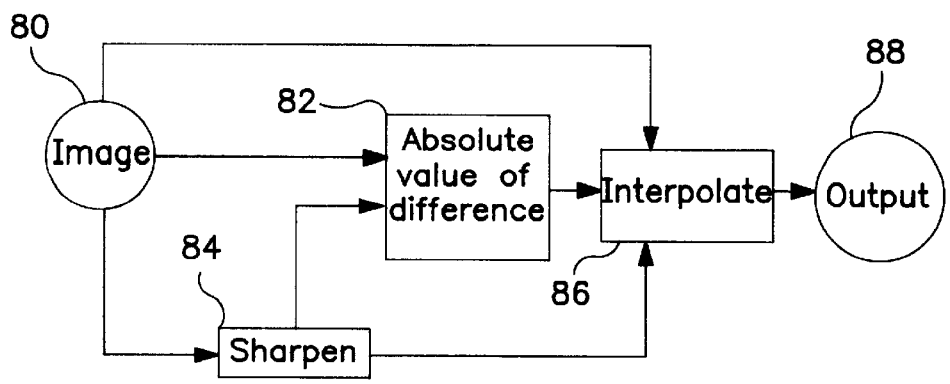
FIG. 7 is a flow diagram illustrating a modification of the third embodiment of FIG. 6.

In FIG. 7, an input image 80 is provided to an interpolation step 86, the input of step 82 for determining the absolute value of a difference between inputs, and to a sharpening filter 84. The sharpening filter 84 provides output to both the absolute value differencing step 82 and the interpolation step 86. The absolute value difference step 82 generates the mapping function provided to the interpolation step 86. In turn, the interpolation step using the input image 80, the output of the absolute value step 82, and the sharpened image produces the final output 88.

Pseudocode for implementing the third and fourth embodiments is set forth in Table 3.

TABLE 3

Let x = image.
Convolve x with blur filter, giving b.
Convolve x with sharpen filter, giving s.
Let g = | s − x | (calculated pixel by pixel).
Apply color map to g, such that opacity channel is set to average of color channels.
Output = (s in g) plus (b out g).

In Table 3, the mapping function g is determined as a function of the sharpened image and the original image, where the difference between the two is taken on a pixel-by-pixel basis and the absolute value of that difference is computed.

In a variation of the embodiment of FIG. 7, the sharpen filter 84 can be replaced with a low-pass filtering step. This variation of the embodiment of FIG. 7 provides an image noise reduction technique.

The foregoing only describes a small number of specific embodiments of the invention and modifications, obvious to those skilled in the art, can be made thereto without parting from the scope of the invention. The image filtering processes can be implemented as computer software comprising a set of instructions to be carried out using a processing unit, which may be implemented using a general purpose microprocessor, a customised signal processor, or the like. The set of instructions may be stored on a recording medium, a non-volatile memory, or the like, for retrieval into memory internally or externally coupled to the processing unit, where the processing unit executes the set of instructions to carry out the process modules. Further examples of computer readable medium include a floppy disk, a magnetic fixed storage device or hard disk, an optical disk, a magneto-optical disk, a non-volatile memory card, and networked resources. For example, networked resources include client/server system that provide information over a network such as the Internet and Ethernet network.

What is claimed is:

1. A method of filtering an image signal, the image signal representing an image, said method comprising the steps of:

filtering the image signal to provide a filtered image signal representing a filtered image;

determining a mapping function from a predetermined arbitrary continuous function of said image signal, wherein said mapping function is an absolute value of a difference between said image signal and said filtered image signal; and interpolating between the filtered image signal and the image signal in accordance with said mapping function to produce a final image signal representing a final image.

2. The method according to claim 1, wherein said predetermined arbitrary function is piece-wise continuous, being characterised in that the domain of the function maps to more than two corresponding range values.

3. The method according to claim 1 wherein a smoothened transition is produced in said final image signal between said filtered image signal and said image signal.

4. The method according to claim 1, wherein the filtering step comprises the step of applying a sharpening filter to the image signal, and the filtered image signal is a sharpened image signal.

5. The method according to claim 4, wherein the sharpening filter is a high-pass filter.

6. The method according to claim 1, wherein the mapping function comprises a spatial gradient map function of the image signal.

7. The method according to claim 1, wherein the image signal, the filtered image signal and the final image signal are digital signals comprising picture element information of the image, the filtered image and the final image, respectively.

8. The method according to claim 7, wherein said picture element information further includes information on the opacity of the picture elements.

9. The method according to claim 8, wherein the interpolating step further comprises the step of adjusting an opacity of each picture element in accordance with the mapping function.

10. The method according to claim 1, wherein said steps are implemented using a computer.

11. A method of filtering an image signal representing an image, said method comprising the steps of:
applying a first filter to the image signal to provide a first filtered image signal;
applying a second filter to the image signal to provide a second filtered image signal;
generating a mapping function from a predetermined continuous arbitrary function of said image signal, wherein said mapping function is an absolute value of a difference between said first filtered signal and said image signal; and
interpolating between the first and second filtered image signals in accordance with said mapping function to produce a final image signal.

12. A method according to claim 11, wherein said predetermined arbitrary function is piece-wise continuous, being characterised in that the domain of the function maps to more than two corresponding range values.

13. A method according to claim 11, wherein a smoothened transition is produced in said final image between said first and second filtered images.

14. The method according to claim 11, wherein the first filter is a sharpening filter, and the first filtered image signal is a sharpened image signal resulting from the sharpening filter applied to the image signal.

15. The method according to claim 14, wherein the sharpening filter is a high-pass filter.

16. The method according to any one of claims 11, wherein the second filter is a blur filter, and the second filtered image signal is a blurred image signal resulting from the blur filter applied to the image signal.

17. The method according to claim 11, wherein the mapping function comprises a spatial gradient map function of the image signal.

18. The method according to claim 11, wherein said steps are implemented using a computer.

19. An apparatus for filtering an image signal representing an image, said apparatus comprising:
input means for receiving said image signal;
at least one filtering means, coupled to the input means, for filtering the image signal to provide a corresponding filtered signal;
mapping means, coupled to the input means to receive the image signal, for providing a mapping function of the image signal in accordance with a predetermined continuous arbitrary function, wherein said mapping means further comprises means for determining a difference between said image signal and a filtered signal, and means for calculating the absolute value of said difference; and
compositing means, coupled to the input means, the at least one filtering means and the mapping means, for interpolating said image signal with said each filtered signal in accordance the mapping function to provide a final image signal.

20. The apparatus according to claim 19, wherein said predetermined arbitrary function is piece-wise continuous, being characterised in that the domain of the function maps to more than two corresponding range values.

21. The apparatus according to claim 19, wherein a smoothened transition between said image signal and said each filtered signal is produced by said mapping function.

22. The apparatus as recited in claim 19, wherein the at least one filtering means includes sharpen filtering means for sharpening said image signal to provide a sharpened image signal as said corresponding filtered signal.

23. The apparatus as recited in claim 19, wherein said at least one filtering means comprises means for blurring said image signal to provide a blurred image signal, said blurred image signal provided to said compositing means as said image signal.

24. The apparatus as recited in claim 19, wherein the mapping means further includes differential filtering means for spatially differentiating said image signal.

25. The apparatus as recited in claim 19, wherein the at least one filtering means comprises edge detection filtering means for detecting edges of said image in said image signal.

26. The apparatus as recited in claims 19 or 25, wherein said mapping means comprises means for normalising said mapping function.

27. The apparatus as recited in claim 19, wherein said filtering means is implemented using a graphics processor.

28. The apparatus as recited in claim 19, wherein said interpolating means comprises a compositing circuit having predefined compositing instructions usable for interpolating between said image signal and said each filtered signal.

29. The apparatus as recited in claim 28, wherein said compositing circuit is implemented using a graphics processor.

30. A computer program product having a computer readable medium having a computer program recorded thereon for filtering an image signal, the image signal representing an image, said computer program comprising;
means for filtering the image signal to provide a filtered image signal representing a filtered image;
means for determining a mapping function from a predetermined continuous arbitrary function of said image signal, wherein said means for determining the mapping function is also dependent upon said filtered image signal, and further comprises means for determining an absolute value of a difference between said image signal and said filtered image signal; and means for interpolating between the filtered image signal and the image signal in accordance with said mapping function to produce a final image signal representing a final image.

31. The computer program product according to claim 30, wherein said predetermined arbitrary function is piece-wise continuous, being characterised in that the domain of the function maps to more than two corresponding range values.

32. The computer program product according to claim 30, wherein a smoothened transition is produced in said final image signal between said filtered image signal and said image signal.

33. The computer program product according to claim 30, wherein the filtering means comprises a sharpening filter, and the filtered image signal is a sharpened image signal.

34. The computer program product according to claim 30, wherein the mapping-function determining means comprises means for generating a spatial gradient map function of the image signal.

35. The computer program product according to claim 30, wherein the interpolating means further comprises means for adjusting an opacity of each picture element of said filtered image signal and said image signal in accordance with the mapping function.

36. The computer program product according to claim 30 wherein said computer readable medium is selected from the group consisting of a floppy disk, a hard disk, an optical disk, a magneto-optical disk, a memory device a networked resource, and a non-volatile memory card.

37. A computer program product having a computer readable medium having a computer program recorded thereon for filtering an image signal, said method comprising the steps of:

first filtering means for filtering the image signal to provide a first filtered image signal;

second filtering means for filtering the image signal to provide a second filtered image signal;

means for generating a mapping function from a predetermined continuous arbitrary function of said image signal, wherein the generating means comprises means for determining an absolute value of a difference between said first filtered signal and said image signal; and means for interpolating between the first and second filtered image signals in accordance with said mapping function to produce a final image signal.

38. The computer program product according to claim 37, wherein said predetermined arbitrary function is piece-wise continuous, being characterised in that the domain of the function maps to more than two corresponding range values.

39. The computer program product according to claim 37, wherein a smoothened change is produced in said final image between said first and second filtered image signals.

40. The computer program product according to claim 37, wherein the first filtering means is a sharpening filter, and the first filtered image signal is a sharpened image signal resulting from the sharpening filter applied to the image signal.

41. The computer program product according to claim 40, wherein the sharpening filter is a high-pass filter.

42. The computer program product according to any one of claims 37, wherein the second filtering means is a blur filter, and the second filtered image signal is a blurred image signal resulting from the blur filter applied to the image signal.

43. The computer program product according to claim 37, wherein the generating means comprises means for producing a spatial gradient map function of the image signal.

44. The computer product according to claim 30, wherein said computer readable medium is selected from the group consisting of a floppy disk, a hard disk, an optical disk, a magneto-optical disk, a memory device, a networked resource, and a non-volatile memory card.

* * * * *

UNITED STATES PATENT AND TRADEMARK OFFICE
CERTIFICATE OF CORRECTION

| | | |
|---|---|---|
| PATENT NO. | : | 6,094,511 |
| DATED | : | July 25, 2000 |
| INVENTOR(S) | : | JAMES ROBERT METCALFE, ET AL. |

Page 1 of 2

It is certified that error appears in the above-identified patent and that said Letters Patent is hereby corrected as shown below:

ON THE TITLE PAGE AT [57] ABSTRACT

Line 1, "in" should read --is--.

COLUMN 3

Line 60, "provided" should read --directly provided--.

COLUMN 4

Line 53, "represent" should read --represents--.

COLUMN 5

Line 34, "(i.c." should read --(i.e.--.

COLUMN 6

Line 54, "normalised" should read --normalises--.

COLUMN 7

Line 7, "can" should read --can be--;
    Line 24, "bus 126" should read --bus 126,--.

COLUMN 8

Line 13, "White" should read --While--;
    Line 22, "embodiment." should read --Embodiment.--

COLUMN 9

Line 7, "clement" should read --element--;
    Line 58, "is" should be deleted;
    Line 65, "filter" should read --filter steps--.

COLUMN 11

Line 9 "claim 1" should read --claim 1,--.

UNITED STATES PATENT AND TRADEMARK OFFICE
CERTIFICATE OF CORRECTION

PATENT NO.   : 6,094,511
DATED        : July 25, 2000
INVENTOR(S)  : JAMES ROBERT METCALFE, ET AL.

It is certified that error appears in the above-identified patent and that said Letters Patent is hereby corrected as shown below:

COLUMN 12

Line 21, "accordance" should read --accordance with--.

COLUMN 13

Line 28, "claim 30" should read --claim 30,--.

COLUMN 14

Line 26-27 "any one of claims 37," should read --claim 37,--.

Signed and Sealed this

Twenty-ninth Day of May, 2001

Attest:

NICHOLAS P. GODICI

Attesting Officer    Acting Director of the United States Patent and Trademark Office